Nov. 24, 1959  W. R. KANNE  2,914,594
THERMAL COUPLE FOR MEASURING TEMPERATURE IN A REACTOR
Filed Jan. 4, 1946
FIG_3_
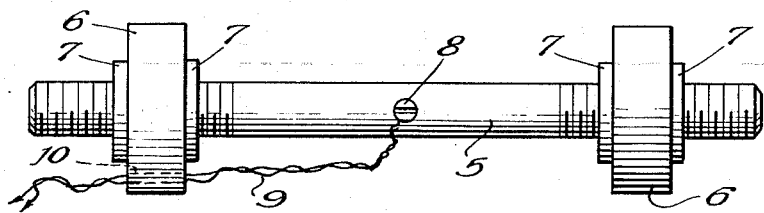
FIG_1_
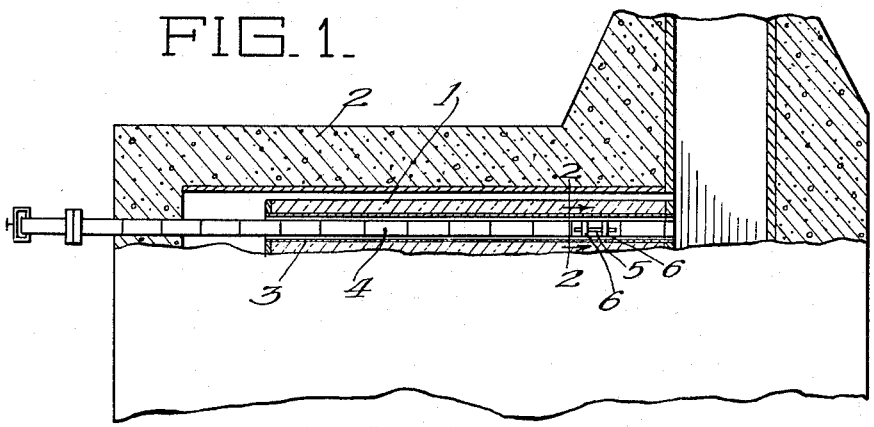
FIG_4_
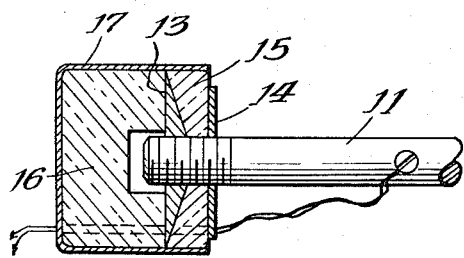
FIG_2_
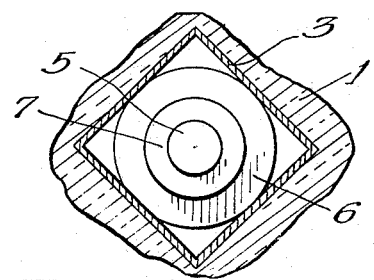
Witnesses:
Herbert E. Metcalf
John H. Leonard
Inventor:
William Rudolph Kanne
By Robert H. Cavender
Attorney

2,914,594

THERMAL COUPLE FOR MEASURING TEMPERATURE IN A REACTOR

William Rudolph Kanne, Richland, Wash., assignor to the United States of America as represented by the United States Atomic Energy Commission Application January 4, 1946, Serial No. 639,138

6 Claims. (Cl. 136—4)

This invention relates to neutronic reactors, and particularly to a device for measuring the temperature within a neutronic reactor of the air-cooled type.

One of the principal objects of the present invention is to provide a device for determining the temperature in the coolant passages or tubes of a reactor in which bodies of fissionable material are placed during neutronic bombardment in a reactor.

Another object is to thermally insulate the temperature responsive part of the present device for heat conducting parts of the reactor so that the device is responsive substantially only to air passing through the tubes.

Another object is to provide a simple and inexpensive thermocouple which may be installed for operation in a reactor in the same manner as the bodies of fissionable material so as to make possible the obtaining of the proper temperatures without interfering with the charging and discharging operations of the reactor.

A more specific object is to provide a thermocouple for the primary purpose described which may be manipulated in such a manner that the temperatures of the bodies of active material may also be determined thereby.

Other objects and advantages will become apparent from the following descriptions wherein reference is made to the drawings in which:

Fig. 1 is a diagrammatic, vertical, longitudinal, sectional view of an air cooled reactor showing one of the cooling tubes with the device of the present invention installed therein;

Fig. 2 is an enlarged cross sectional view taken on line 2—2 of Fig. 1;

Fig. 3 is an enlarged side elevation of a device embodying the principles of the present invention; and Fig. 4 is a fragmentary longitudinal sectional view, partly in elevation, illustrating a modification of the device shown in Fig. 3.

Referring to Fig. 1, the reactor comprises generally a mass 1 of moderating material, such as graphite, enclosed in suitable shielding, indicated generally at 2. Passages, which preferably are in the form of tubes 3, extend from front to rear through the mass 1 of moderating material and shielding 2 and are accessible at their front end for permitting the insertion of bodies 4 of fissionable material. For a more detailed consideration of reactors suitable for reception of the device of the present invention, reference is made to the copending applications of Fermi and Szilard, Serial Number 596,465, filed May 29, 1945, now Patent No. 2,708,656, and Fermi and Leverett, Serial Number 578,278, filed February 16, 1945, now Patent No. 2,837,447.

In the form of reactor illustrated, the tubes 3 are preferably thin-walled aluminum of square cross section disposed in the mass 1 with one diagonal thereof vertical.

The bodies 4 are of circular cross section and comprise fissionable material enclosed in thin-walled aluminum casings.

Air is forced continuously through the tubes 3 from the front or charging face of the reactor and is discharged therefrom at the rear or discharge face, a sufficient quantity of air being provided to cool the bodies 4 to the desired temperature.

For some purposes, it is desirable to determine the temperature of the cooling air at different points throughout the length of the tube 3, and some difficulty has been experienced in providing a means for supporting a thermocouple in the tube in a manner such that it is not affected by thermal conduction of heat thereinto by direct metal-to-metal contact with parts of the reactor.

In order to provide a thermocouple device which may be inserted into the tubes 3 along with the bodies 4 and which is thermally insulated from the tubes so that the temperature indicated by the thermocouple is that of the cooling air only, the structure illustrated in Fig. 3 is provided.

Referring to Fig. 3, the device comprises a rod 5 composed of a material having high thermal conductivity and low neutron absorption cross section, such as aluminum. Near the ends of the rod 5 are disposed discs 6 of graphite, the discs 6 being of the same or larger radius than the bodies 4. Suitable washers 7 in screw-threaded engagement with rod 5 are provided at opposite faces of each disc 6 to hold the discs in a proper position rigid with the rod 5. The rod 5 extends longitudinally outwardly beyond each disc 6. Midway between the discs 6, an iron-constantin thermal junction is fastened to the rod 5 by means of a screw 8, and the wires 9 from the thermal junction extend through a suitable passage 10 in one of the discs 6.

As hereinbefore mentioned, the device illustrated in Fig. 3 is inserted into one of the tubes 3 in the same manner as one of the bodies 4 and is moved with the bodies 4 along tube 3 to the desired position, the wires 9 being fed in along the bottom of the associated tube 3. If it is desired to determine the temperature of the air only, the device is pushed into the tube 3 until it contacts the last previously inserted body, then is drawn back slightly so as to eliminate any contact of the rod 5 and the end of the adjacent body. Additional bodies 4 are then pushed into the tube, preferably only far enough so that the subsequent body next adjacent to the device is spaced from the end of the rod 5. The spacing of the ends of the rod 5 from adjacent bodies is sufficient to prevent direct heat radiations from the ends of the bodies to the rod 5. Thus the rod is thermally insulated from the walls of the tube 3 by the spacing effected by the discs 6, and is thermally insulated from adjacent bodies by the air space between the ends of the bodies and the ends of the rod 5. The rod 5 serves as a heat reservoir which prevents errors in measurement due to local eddies and surges in the region of the junction of the wires 9.

If, on the other hand, it is desired to obtain the temperature of a body itself, it is only necessary that the device be pushed into the tube so as to cause one or both ends of the rod 5 to engage the ends of the bodies adjacent thereto. When so disposed, the metal conduction of heat from the bodies through the rod 5 is so predominant relative to the temperature provided by the air that a substantially direct response to the temperature of the bodies may be obtained.

Referring next to Fig. 4, a modification of the device is illustrated. In this modification provision is made to prevent contact between any of the bodies and the ends of the rod of the device so that without any adjustment of the position of the device within the tube 3, it is responsive only to the temperature of air passing through the tube and is insulated from all other parts of the reactor and from the bodies.

In this modification a rod 11, similar in all respects to rod 5 and provided with thermocouple similar to that heretofore described, is provided. Each end of the rod 11 is in threaded engagement with suitable washers 13 and 14 between which is interposed an insulating disc 15, preferably of graphite and similar in all respects to the discs 6. In addition, however, and for the purpose of preventing contact with the ends of the rod 11, an insulating disc 16 of graphite or other insulating material is provided. The disc 16 is held in position overlying the end of the rod 11 and in juxtaposition with the washer 13 by means of an aluminum cap 17, the open end of which is peened over the inner edge of the disc 15. With this arrangement the device may be placed in the tube in the same manner as one of the bodies 4 and moved there along to the desired position without further adjustment by forcing in other bodies.

Having thus described the invention, what is claimed is:

1. A thermocouple device for measuring the temperature of a flowing fluid in a square cross sectioned conduit comprising a metallic rod, a thermocouple junction secured to the rod centrally thereof, and thermal insulating round support discs of diameter greater than the rod secured to the end portions of the rod, said discs adapted to fit transversely in said conduit.

2. The thermocouple device of claim 1 wherein one of said support discs has an aperture therethrough and there are provided lead wires connected to said junction and extending through said aperture.

3. The thermocouple device of claim 1 wherein the insulating support discs are cup-shaped, whereby the rod is insulated from any bodies in end-to-end relationship therewith.

4. The thermocouple device of claim 1 wherein the rod has a thermal conductivity at least equal to that of aluminum and a neutron absorption cross section at most equal to that of aluminum and the support discs have a thermal conductivity at most equal to that of graphite and a neutron absorption cross section at most equal to that of graphite.

5. A thermocouple device for measuring the temperature of a flowing fluid in a square cross sectioned conduit in a neutronic reactor comprising a rod having a thermal conductivity at least equal to that of aluminum and a neutron absorption cross section at most equal to that of aluminum, a thermocouple junction secured to the rod centrally thereof, round support discs on the ends of the rod of greater diameter than the rod having a thermal conductivity and a neutron absorption cross section at most equal to those of graphite, said support adapted to fit transversely in said conduit, one of said support discs having an aperture therethrough, and lead wires connected to said junction and extending through said aperture.

6. The thermocouple device of claim 1 wherein the insulating support discs are annular shaped and are spaced from the ends of the metallic rod.

References Cited in the file of this patent

UNITED STATES PATENTS

| 885,430 | Bristol | Apr. 21, 1908 |
| 1,365,465 | Des Isles | Jan. 11, 1921 |
| 2,384,200 | Shoemaker | Sept. 4, 1945 |
| 2,537,612 | Wildermuth | Jan. 9, 1951 |

FOREIGN PATENTS

| 114,151 | Australia | May 3, 1940 |
| 233,011 | Switzerland | Oct. 2, 1944 |

OTHER REFERENCES

Fermi et al.: "Artificial Radioactivity Produced by Neutron Bombardment-II," Proceedings of the Royal Society of London, Series A, No. 868, vol. 149, pages 554–557, April 1935.

Smyth: "Atomic Energy for Military Purposes," August 1945. Copies may be purchased from Supt. of Documents, Washington 25, D.C.